United States Patent [19]
Simms et al.

[11] Patent Number: 6,138,186
[45] Date of Patent: Oct. 24, 2000

[54] BURST TRANSFER MANAGEMENT SYSTEM UTILIZING POINTERS TO ENSURE THAT THERE IS ENOUGH SPACE IN A BUFFER TO RECEIVE BURST TRANSFERS WITHOUT CORRUPTING DATA

[75] Inventors: Mark J. Simms, Boise; R. Alexis Takasugi, Eagle, both of Id.

[73] Assignee: Hewlett-Packard Company, Palo Alto, Calif.

[21] Appl. No.: 09/119,168

[22] Filed: Jul. 20, 1998

[51] Int. Cl.⁷ ...................................................... G06F 13/00
[52] U.S. Cl. .................................. 710/52; 710/53; 710/34; 710/35; 710/57
[58] Field of Search .................................. 710/15, 34, 35, 710/52, 57, 53

[56] References Cited

U.S. PATENT DOCUMENTS

| | | | |
|---|---|---|---|
| 4,241,420 | 12/1980 | Fish et al. | 711/112 |
| 4,843,544 | 6/1989 | DuLac et al. | 710/53 |
| 5,359,468 | 10/1994 | Rhodes et al. | 360/48 |
| 5,504,873 | 4/1996 | Martin et al. | 711/111 |
| 5,710,942 | 1/1998 | Nakagaki et al. | 710/52 |
| 5,754,535 | 5/1998 | Vandenabeele et al. | 370/321 |
| 5,805,930 | 9/1998 | Rosenthal et al. | 710/57 |
| 5,968,147 | 10/1999 | Polfer et al. | 710/52 |

Primary Examiner—Thomas C. Lee
Assistant Examiner—Tammara Peyton
Attorney, Agent, or Firm—Matthew L. Wade

[57] ABSTRACT

A system for managing burst data transfers from a sending device to the buffer memory of a receiving device and for managing read operations upon the buffer memory after receiving data. In one arrangement, the system includes data management apparatus that is used in a tape storage device. The data management apparatus uses a Start of Burst pointer, a Current Position pointer and a Tape Mechanism pointer to simplify several functions. These functions include the determination of whether to enable a burst from a sending device and the determination of whether to perform a series of read operations upon the buffer memory. In addition, the Start of Burst pointer and the Current Position pointer are used to re-write a burst into the buffer memory if a previously received burst is determined to be invalid.

18 Claims, 3 Drawing Sheets

BURST TRANSFER MANAGEMENT SYSTEM UTILIZING POINTERS TO ENSURE THAT THERE IS ENOUGH SPACE IN A BUFFER TO RECEIVE BURST TRANSFERS WITHOUT CORRUPTING DATA

FIELD OF THE INVENTION

This invention relates to data management, and more particularly to data management of burst data transfers for a receiving device

BACKGROUND OF THE INVENTION

Host computers often operate with one or more mass storage devices, such as a hard disk drive or magnetic tape drive, over some sort of communication interface. As is known in the art, both host computers and mass storage devices typically have transceiver capability. Therefore, for purposes of this application, a host computer is also referred to herein as a "receiving device" or as a "sending device". Likewise, a mass storage device is also referred to herein as a "receiving device" or as a "sending device".

Today's communication links, such as the Small Computer Systems Interface (SCSI interface), support high data transfer rates. In order to make use of these high data transfer rates, both host computers and mass storage devices typically include one or more buffer memory devices (buffer memory). The buffer memory is used to receive and temporarily store incoming data at the high data transfer rate supported by the particular communication link being used. After the data is received, it may then be read from the buffer memory and processed. An example of a mass storage device making use of a buffer memory for this purpose can be found in U.S. Pat. No. 4,843,544, entitled Method and Apparatus for Controlling Data transfers Through Multiple Buffers. That Patent is incorporated herein by reference.

In order to efficiently transfer data from a sending device to a receiving device, some communications links (e.g., the SCSI interface) support burst data transfers. A burst data (burst) transfer is a series of data transfers that occurs without an interrupt between one device and another device. A receiving device that is able to receive burst transfers will typically include both a buffer memory and some sort of data management system for managing the burst transfers. The data management system can be used to perform a number of functions. For example, the data management system can determine whether to enable the next transfer of a burst from a sending device. This determination is largely based on whether there is enough space available in the buffer memory of the receiving device to receive the burst without corrupting previously stored data. The data management system could also be used to coordinate the re-transmission and rewriting of a burst into the buffer memory if an originally transmitted burst was determined invalid.

Prior art data management systems for accomplishing these functions include a microprocessor and a software routine, or alternatively a relatively complex state machine. This can result in significant system overhead, thereby reducing the performance level of a receiving device, or alternatively require the need for high cost control circuitry to achieve the desired performance level.

SUMMARY OF THE INVENTION

The present invention includes data management apparatus which can be used by a receiving device for managing burst transfers from a sending device. The data management apparatus includes a first storage register for storing a Start of Burst pointer, a second storage register for storing a Current Position pointer, and a third storage register for storing a Tape Mechanism pointer. In addition, the data management apparatus includes an interface-control unit which is connected to the first storage register, the second storage register, the third storage register and a buffer memory of the receiving device.

The interface-control unit is implemented to enable a burst if the Start of Burst pointer and the Current Position pointer are identifying the same storage area in the buffer memory and a logical difference between the Start of Burst pointer (or the Current Position pointer) and the Tape Mechanism pointer indicates the buffer memory has enough storage areas to receive the burst without corrupting previously stored data. The interface-control unit can be further implemented to perform burst read operations upon the buffer memory if the logical difference further indicates that there are enough data packets in the buffer memory to form a minimum burst length.

The present invention also includes a method for use by a receiving device to manage a burst transfer from a sending device. The method includes a first step of generating a Start of Burst pointer, a Current Position pointer and a Tape Mechanism pointer. After the three pointers have been generated, the method further includes the step of enabling a burst if the Start of Burst pointer and the Current Position pointer are currently identifying the same storage area in a buffer memory of the receiving device and if the logical difference between the Current Position pointer (or the Start of Burst pointer) and the Tape Mechanism pointer indicates that the buffer memory has enough storage areas to receive the burst without corrupting previously stored data. The method further includes the steps of receiving the burst into the buffer memory and then determining if the burst is valid. If the burst is determined to be invalid, the method further includes the steps of moving the Current Position pointer to the current position of the Start of Burst pointer and then re-enabling the burst. This results in the burst being re-transmitted and re-written into the same storage areas of the buffer memory occupied by the previously received burst. This invention can used in a wide range of receiving devices including a tape storage device or a host computer.

DETAILED DESCRIPTION OF THE INVENTION

A receiving device that is able to receive burst transfers will typically include both a buffer memory and some sort of data management system for managing the burst transfers. The data management system can be used to perform a number of functions. For example, the data management system can determine whether to enable the next transfer of a burst from a sending device. This determination is largely based on whether there is enough space available in the buffer memory of the receiving device to receive the burst without corrupting previously stored data. The data management system could also be used to coordinate the re-transmission and rewriting of a burst into the buffer memory if an originally transmitted burst was determined invalid. Again, this must be accomplished without corrupting previously stored data.

As disclosed herein, the present invention provides data management apparatus that performs these functions without the high system overhead associated with the prior art or the need for a complex state machine to achieve the desired performance level.

Figure 1:
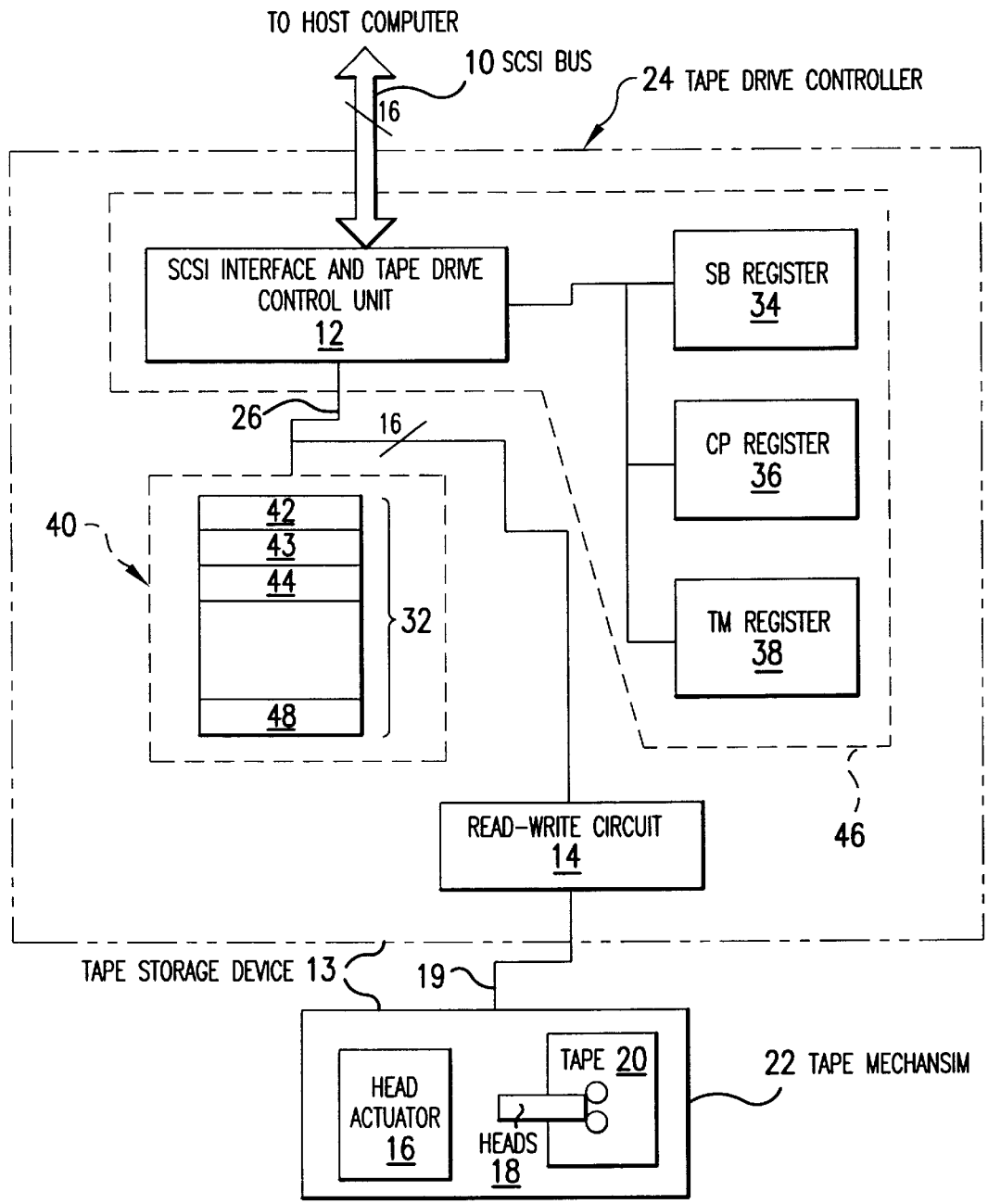
FIG. 1 is a circuit block diagram illustrating an exemplary embodiment of the present invention.

FIG. 1 is a circuit block diagram illustrating a first exemplary embodiment of the present invention. Referring to FIG. 1, a host computer (not shown) is connected to Tape Storage Device 13. Tape Storage Device 13 adheres to a Digital Data Storage (DDS) standard (defined by ISO/IEC Standard 10777:1991 E) and includes a Tape Drive Controller 24 and a Tape Mechanism 22. The host computer is connected to Tape Drive Controller 24 via SCSI Bus 10 which is a "fast wide" SCSI communication link well known in the art.

For purposes of this application, a "data packet" is a group of binary bits (bits), that is transferred as a unit over a communication link to a receiving device. The number of bits in a data packet may be defined differently for different implementations of the present invention. This is dependant, in part, upon the type of communication link used. For the present embodiment, a data packet is defined to be 8-bits wide. SCSI Bus 10 includes sixteen parallel data lines and can therefore transfer two data packets (in parallel) at a time during each data transfer.

Tape Drive Controller 24 is represented in FIG. 1 by functional blocks which are useful for describing the invention. These functional blocks include a buffer memory 40, a Read-Write Circuit 14 and a Data Management Apparatus 46 all interconnected via Internal Bus 26. Internal Bus 26 includes sixteen parallel data lines and can therefore transmit two data packets (in parallel) at a time during each data transfer.

As shown, Data Management Apparatus 46 includes a "SCSI Interface and Tape Drive Control Unit" (Interface-Control Unit 12) and three programmable registers: "Start of Burst" (SB) Register 34, "Current Position" (CP) Register 36 and "Tape Mechanism" (TM) Register 38. The operations of these functional blocks are explained in greater detail below.

Tape Mechanism 22 is connected to Read-Write Circuit 14 via Second Internal Bus 19. Tape Mechanism 22 is also represented in FIG.1 by functional blocks which are as follows: Read-Write Heads (Heads) 1 8, a Head Actuator 16 for controlling the movement of Heads 18, and Tape 20. Tape 20 serves as the mass storage medium for Tape Storage Device 13. The operations of these functional blocks are well known in the art and therefore will not be considered in detail.

Data packets are typically transferred between the host computer and Tape Storage Device 13 over SCSI bus 10 in bursts. When Tape Storage Device 13 is receiving a burst, Tape Storage Device 13 is referred to herein as in a "Write Mode".

When Tape Storage Device 13 is in a Write Mode, a burst received over SCSI Bus 10 is written into Buffer Memory 40. After the burst is received, the data in the burst is later read from Buffer Memory 40 and is transmitted to Read-Write Circuit 14. In order to make efficient use of Internal Bus 26, these read operations are typically performed in series. Read operations preformed in this manner are referred to herein as a "burst read". A burst read operation results in multiple data packets being transmitted from Buffer Memory 40 to Read-Write Circuit 14 over Internal Bus 26 without an interrupt. Thus, this is also a type of burst transfer. To differentiate between a burst transfer from the host computer to Tape Storage Device 13 and a burst transfer from Buffer Memory 40 to Read-Write Circuit 14, the former is referred to herein as a "SCSI Burst" and the latter is referred to herein as a "Mechanism Burst". Furthermore, a data transfer that is part of a SCSI Burst is referred to herein as a "SCSI data transfer". Likewise, a data transfer that is part of a Mechanism Burst is referred to herein as a "Mechanism data transfer".

The length of a SCSI Burst in terms of number of data packets is referred to herein as the "SCSI Burst Length" or alternatively as "SBL". The length of a Mechanism Burst, in terms of number of data packets, is referred to herein as the "Mechanism Burst Length" or alternatively as "MBL". In this embodiment, the SCSI burst length and Mechanism burst length can vary. In addition, both types of bursts occur on an asynchronous basis.

During a typical SCSI data transfer, two data packets (containing a total of two bytes of SCSI burst data) are transmitted over the sixteen data lines of SCSI Bus 10 and are each received by Interface-Control Unit 12. According to the SCSI protocol, the first data packet in any one SCSI data transfer is transmitted over the D0–D7 data lines of SCSI Bus 10. In addition, the second data packet is transmitted over the D8–D15 data lines of SCSI Bus 10.

After two data packets are received during a SCSI data transfer, Interface-Control Unit 12 responds by writing each data packet into Buffer Memory 40. This operation is referred to herein as a "buffer write operation". Interface-Control Unit 12 performs each buffer write operation under the control of a pointer, referred to herein as a "Current Position" (CP) pointer, which is located in CP Register 36. The CP pointer is used by Interface-Control Unit 12 to identify the next storage area in Buffer Memory 40 to receive a data packet. This pointer is updated by Interface-Control Unit 12 after each buffer write operation so as to operate Buffer Memory 40 as a cyclic buffer.

To provide a basis for further discussion of the CP pointer, a representative portion of the storage areas in Buffer Memory 40 are depicted in FIG. 1. As shown, each storage area is depicted as being part of a logical column, Column 32. The write operations are performed under the control of the CP pointer so as to write data packets into Buffer Memory 40 from the top of Column 32 to the bottom of Column 32.

The CP pointer, in its initial state, identifies the first storage area in Column 32 (First Storage Area 42). Thus, if two data packets are received by Interface-Control Unit 12 (during a SCSI data transfer) while the CP pointer is in its initial state, Interface-Control Unit 12 responds to this condition by writing the data packet received over the D0–D7 data lines into First Storage Register 42. In addition, Interface-Control Unit 12 further responds by writing the data packet received over the D8–D15 data lines into the second storage area in Column 32 (Second Storage Area 43). Interface-Control Unit 12 then updates the CP pointer by changing the value (referred to herein as "moving" the pointer) in CP Register 36 so that the CP pointer identifies the third storage area in Column 32 (Third Storage Area 44). As additional write operations are performed, the CP pointer is moved in a downward direction along Column 32 in a similar manner. The CP pointer is updated beyond the last storage area of Buffer Memory 40 (Last Storage Area 48) by wrapping the CP pointer back to the top of Column 32.

It is noted that in other embodiments, the storage areas forming a logical column similar to the one just described could be located within multiple buffer memory devices or alternatively consist of a portion of the available storage areas in a single buffer memory. Either of these two cases does not depart from the present invention.

During a typical Mechanism data transfer, two data packets (containing a total of two bytes of Mechanism burst data) are read by Interface-Control Unit 12 and are transmitted over the data lines of Internal Bus 26 to Read-Write Circuit 14. This operation is referred to herein as a "buffer read operation". Each of these buffer read operations are controlled by a second pointer, referred to herein as a Tape Mechanism (TM) pointer, which is located in TM Register 38. The TM pointer is used by Interface-Control Unit 12 to identify the next data packet that is to be read from Buffer Memory 40 and is updated after each buffer read operation such that data packets are read from Buffer Memory 40 in the order received. Therefore, the TM pointer in its initial state, identifies First Storage Area 42. In addition, the TM pointer is updated by moving the TM pointer in a downward direction along Column 32 (thereby following the CP pointer). Similar to the CP pointer, the TM pointer is updated beyond the last storage area of Buffer Memory 40 (Last Storage Area 48) by wrapping the TM pointer back to the top of Column 32.

A third pointer, referred to herein as a "Start of Burst" (SB) pointer (located in SB Register 34), is used to identify the storage area in Buffer Memory 40 that has received the first data packet in a SCSI burst during any SCSI burst transfer. After the SCSI burst is completely written into Buffer Memory 40 and is determined valid, the SB pointer is then updated to the current position of the CP pointer. As will be discussed in further detail below, in order to handle the case wherein the just received SCSI burst is determined invalid, the next SCSI burst is not enabled until after the SB pointer has been updated.

As a rule, the TM pointer is never advanced past the SB pointer. As can be seen from the above description of the SB pointer, this prevents data that are possibly invalid from being read from Buffer Memory 40.

As will now be discussed, the use of the three pointers just described simplifies the operation of Data Management Apparatus 46 as compared to the prior art.

For example, one function of Data Management Apparatus 46 is to determine whether a just received burst is valid and if the burst is not valid to coordinate the re-transmission and rewriting of that burst into Buffer Memory 40. For purposes of this application, this operation is referred to herein as a "retry routine". As can now be seen, the retry routine is accomplished in a simple manner by use of the SB pointer and CP pointer. If a just received SCSI burst is determined not to be valid, Interface-Control Unit 12 copies the current value in SB Register 34 into CP register 36 and then proceeds to re-enable the just received SCSI burst. Thus, the CP pointer is moved back to identify the same storage area that it did at the start of the original SCSI Burst. As a result, the SCSI burst is re-transmitted and re-written into the same storage areas of Buffer Memory 40 occupied by the previously transmitted SCSI burst. Data previously stored in Buffer Memory 40 (but not yet read) are not overwritten. Therefore, data in Buffer Memory 40 are not corrupted.

According to the SCSI protocol, in order to transmit a certain amount of data to Tape Storage Device 13, the host computer first transfers a request to send the data. Data Management Apparatus 46 receives the request and then assumes further responsibility for burst transfer management. Thus, after this request is received, Data Management 46 operates to enable each subsequent transfer of a SCSI burst that is required in order to transfer the data from the host computer.

In order to properly manage the SCSI burst transfers, Data Management Apparatus 46 only enables a transfer of a SCSI burst if two conditions are satisfied. First, the last received SCSI burst (if any) must have been determined valid. Second, there must be enough room in Buffer Memory 40 to receive the SCSI burst without corrupting previously stored data. As will now be shown, the determination as to whether these two criteria are satisfied is now a simple matter by using the three pointers described above.

To determine whether the first criterion is satisfied, Interface-Control Unit 12 compares the current value in SB Register 34 to the current value in CP register 36 to determine if the SB pointer and the CP pointer are identifying the same storage area. If so, this means that one of two conditions is true: either there is no data in Buffer Memory 40 or that the last SCSI burst written into Buffer Memory 40 was determined to be valid. Both of these conditions satisfy the first criterion. Therefore, if Interface-Control Unit 12 determines that the SB pointer and the CP pointer are currently identifying the same storage area, this informs Interface-Control Unit 12 that the first criterion is satisfied.

To determine whether the second criterion is satisfied, InterfaceControl Unit 12 first calculates the "logical difference" (LD) between the current location of the TM pointer and the SB pointer. The logical difference provides a number that is equal to the number of storage areas in column 32 (referred to herein as the "available storage length") that are available in Buffer Memory 40 to receive the next SCSI burst without corrupting previously stored data.

Figure 2:
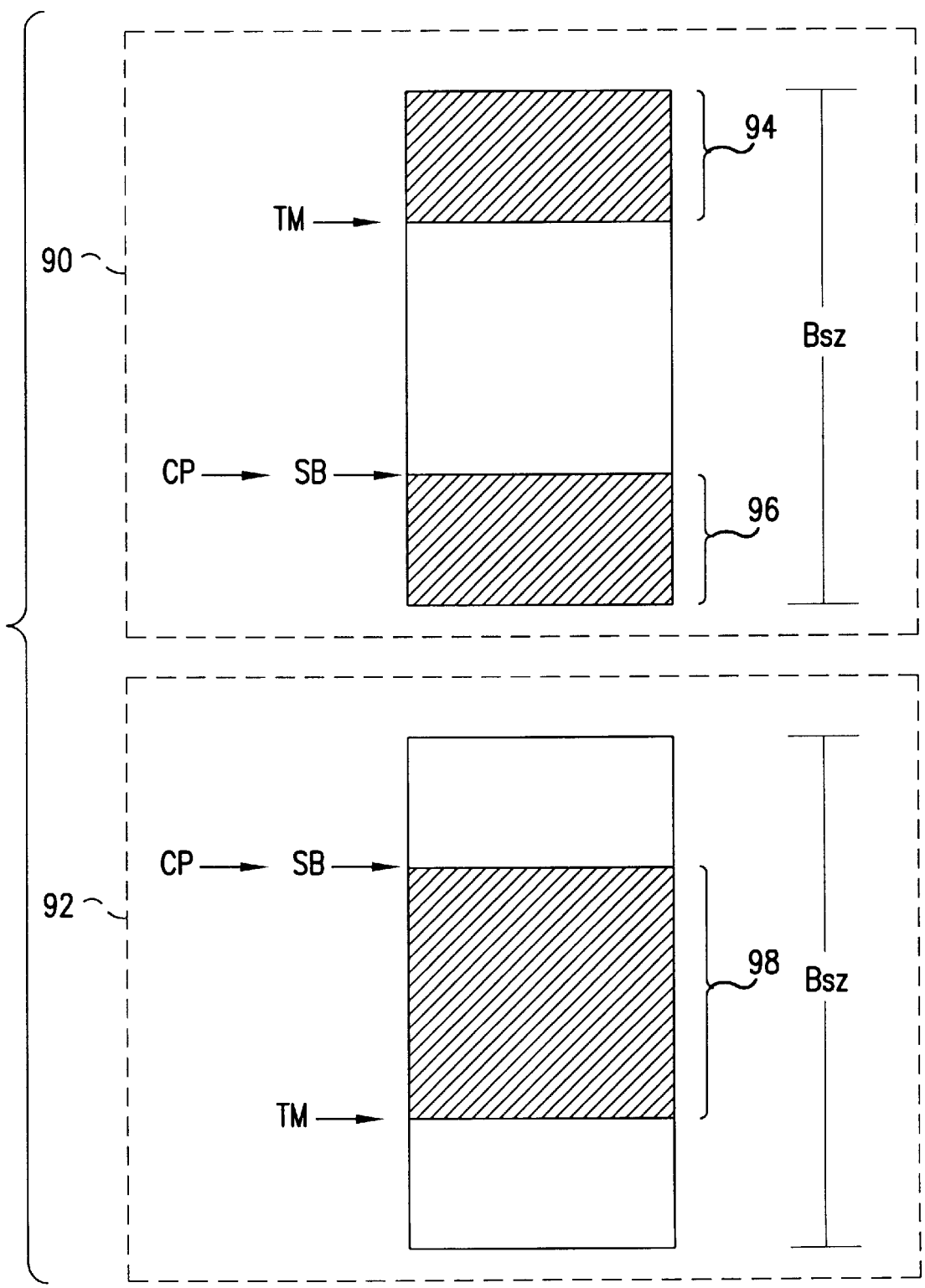
FIG. 2 depicts an abstract diagram of a buffer memory illustrating an exemplary embodiment of the present invention.

FIG. 2 provides a basis for further discussion of the logical difference calculation. In FIG. 2 an abstract diagram of Column 32 is shown under two general conditions. The first condition (depicted within Box 90) exists when the TM pointer is identifying a storage area that has a position in Column 32 above the storage area identified by the CP and SB pointers. This indicates that all three pointers have wrapped through Column 32 the same number of times. As depicted in FIG. 2, under this first condition the logical difference is the number of storage areas in First Area 94 and Second Area 96.

The second condition (depicted within Box 92) exists when the TM pointer is identifying a storage area that is below the storage area currently identified by the CP and SB pointers. This indicates that the TM pointer has wrapped through Column 32 one less time than that of the other two pointers. As depicted in FIG. 2, under this second condition the logical difference is the number of storage areas in Third Area 98.

It can be seen by someone skilled in the art, that the calculation of the logical difference between the TM pointer and the SB pointer can be accomplished in more than one way depending on the particular implementation of the present invention. In the present embodiment, the total number of storage areas (Bsz) in Column 32 is retained in a fourth storage register (not shown in FIG.1). In addition, the values stored in SB register 34 and TM register 38 to represent the SB pointer and the TM pointer are used directly by Interface-Control Unit 12 to determine the logical difference. Thus, if Column 32 is found to be in the first condition then the logical difference is calculated according to the expression: LD=Bsz−(SB−TM). Where SB is the current value stored in SB Register 34 and TM is the current value stored in TM Register 38. If, however, Buffer Memory 40 is in the second condition, then Interface-Control Unit 12 calculates the logical difference according to the expression: LD=TM−SB.

After calculating the logical difference as just described, Interface-Control Unit 12 then makes a determination as to whether the logical difference is greater than or equal to the SCSI burst length. If so, then the second criterion is satisfied and Interface-Control Unit 12 responds by enabling the next SCSI burst transfer. For purposes of this discussion, a logical difference that is greater than or equal to the SCSI burst length is referred to herein as "indicating" there are enough storage areas to receive a burst without corrupting data previously stored in the buffer memory.

It is noted that in the present embodiment, the SB value was used to calculate the Logical Difference. As can be seen by someone skilled in the art, in other embodiments the value stored in the CP Register 36 could also have been used.

Yet another function of Data Management Apparatus 46 is to perform burst read operations when appropriate upon Buffer Memory 40. As previously discussed, a burst read operation results in a Mechanism burst being transmitted between Buffer Memory 40 and Read-Write Circuit 14. If there is new data currently being received into Buffer Memory 40, a burst read operation is only enabled if there are enough data packets in Buffer Memory 40 to form a minimum burst length. Interface-Control Unit 12 makes this determination by first calculating the logical difference (as discussed above) between the TM pointer and SB pointer. After the logical difference is calculated, it is then subtracted from the total number of storage areas in Column 32 (i.e., Bsz). If, after making these calculations, Interface-Control Unit 12 determines there are not enough data packets to form a minimum burst length, then Interface-Control Unit 12 does not enable a burst read operation.

Figure 3:
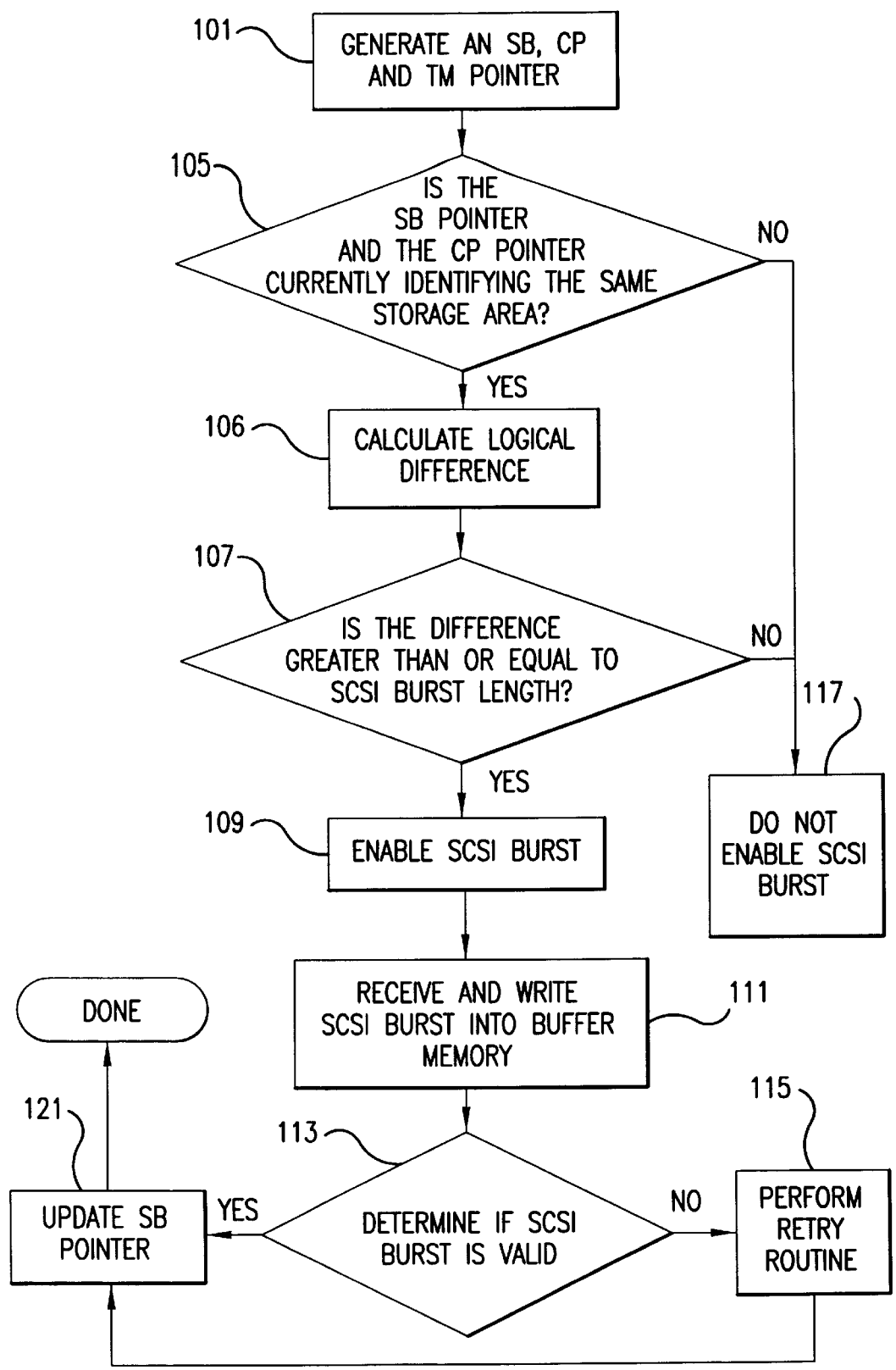
FIG. 3 depicts a logic diagram illustrating an alternative representation of the present invention.

FIG. 3 depicts a logic diagram for illustrating yet another exemplary embodiment of the present invention. In this embodiment, the steps that are depicted in FIG. 3 are performed by a receiving device each time a determination is to be made as to whether to enable the next transfer of a SCSI burst (SCSI burst transfer) from a sending device over a SCSI communication link. The receiving device includes data management apparatus that performs its functions under the control of an SB, CP and TM pointer. In this embodiment, the interface-control unit is adapted to receive two data transfers (instead of one) before writing the data packets into the buffer memory. Thus for each write operation, four data packets are written into the buffer memory and the CP pointer is updated accordingly.

Turning now to FIG. 3, the receiving device first generates an SB, CP and TM pointer (step 101). The interface-control unit then determines if the last received SCSI burst (if any) was determined valid. This is accomplished by determining if the SB pointer and the CP pointer are currently identifying the same storage area (decision step 105). If not, this indicates the last received SCSI burst was not yet determined valid. As a result, the SCSI Burst transfer is not enabled (step 117).

If, however, the SB pointer and CP pointer are currently identifying the same storage area (decision step 105), this means that either there is no data currently in the buffer memory or that the last SCSI burst received into the buffer memory was determined to be valid. Upon making this last determination, the logical difference is then calculated (step 106). As previously discussed, this step can be accomplished by using the SB and TM pointers or the CP and TM pointers.

After making this calculation, if the logical difference is greater than or equal to the SCSI burst length (decision step 107) the SCSI burst transfer is enabled (step 109). Otherwise the SCSI burst transfer is not enabled (step 117).

If the SCSI burst transfer is enabled, the sending device then begins to transmit the SCSI burst over the SCSI communication link to the receiving device. The receiving device operates to receive the SCSI burst and write the SCSI burst into its buffer memory under the control of the CP pointer (step 111). As the SCSI burst is written into the buffer memory, the SB pointer is not moved. Therefore, the SB pointer continues to identify the storage area in the buffer memory that received the first data packet in the SCSI burst.

After the SCSI burst is written into the buffer memory, a determination is then made as to whether the SCSI Burst is valid (step 113). If the SCSI burst is determined not to be valid, then a retry routine is performed (step 115). As part of the retry routine, the CP pointer is moved back to the current position of the SB pointer. Thus, the CP pointer is moved back to identify the same storage area as it did at the start of the original SCSI burst. The SCSI burst is then re-transmitted and rewritten into the buffer memory. After the SCSI burst is determined to be valid, the SB pointer is updated (step 121). This is accomplished by moving the SB pointer to the current position of the CP pointer.

It can be seen from the exemplary embodiments described above, the present invention provides an improved system for managing burst transfers. By using the CP, SB, and TM pointers, a data management system for providing a number of data management functions can now be implemented in a relatively simple hardware circuit. As a result, this invention can result in a receiving device, such as a tape storage device, having improved data handling performance, lower cost or both. It is also noted that the present invention can be implemented without requiring modifications to existing sending devices.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A mass storage device comprising a buffer memory and a data management apparatus, said data management apparatus further comprising:
   (a) a first storage register for storing a first pointer;
   (b) a second storage register for storing a second pointer;
   (c) a third storage register for storing a third pointer; and
   (d) an interface-control unit connected to said first storage register, said second storage register, said third storage register and said buffer memory, said interface-control unit implemented to enable a transfer of a burst from an externally connected host computer only if said first pointer and said second pointer are currently identifying a same storage area in said buffer memory and if a logical difference between said first pointer and said third pointer indicates said buffer memory has enough storage areas to receive said burst without corrupting previously stored data.

2. The mass storage device as recited in claim 1, wherein said first pointer comprises a Start of Burst pointer, said second pointer comprises a Current Position pointer, and said third pointer comprises a Tape Mechanism pointer.

3. The mass storage device as recited in claim 1, wherein said interface-control unit further implemented to perform a burst read operation upon said buffer memory if said logical difference indicates there are enough data packets in said buffer memory to form a minimum burst length.

4. The mass storage device as recited in claim 2, wherein said interface-control unit further implemented to perform a burst read operation upon said buffer memory if said logical difference indicates there are enough data packets in said buffer memory to form a minimum burst length.

5. The mass storage device as recited in claim 2, wherein said interface-control unit further implemented to receive and write said burst into said buffer memory and to respond to said burst being determined invalid after said burst written into said buffer memory by rewriting said burst into said buffer memory according to position of said Start of Burst pointer.

6. The mass storage device as recited in claim 4, wherein said interface-control unit further implemented to receive and write said burst into said buffer memory and to respond to said burst being determined invalid after said burst written into said buffer memory by rewriting said burst into said buffer memory according to position of said Start of Burst pointer.

7. Data management apparatus for a mass storage device, comprising:

(a) means for generating a first pointer;

(b) means for generating a second pointer (c) means for generating a third pointer; and (d) means for enabling a transfer of a burst from an externally connected host computer only if said first pointer and said second pointer are identifying a same storage area in a buffer memory and if a logical difference between said first pointer and said third pointer indicates said buffer memory has enough storage areas to receive said burst without corrupting previously stored data, said enabling means connected to said first pointer generating means, said second pointer generating means and said third pointer generating means.

8. Data management apparatus as recited in claim 7, wherein said first pointer comprises a Start of Burst pointer, said second pointer comprises a Current Position pointer, and said third pointer comprises a Tape Mechanism pointer.

9. Data management apparatus as recited in claim 8, wherein said enabling means further for performing a burst read operation upon said buffer memory in response to said logical difference indicating there are enough data packets in said buffer memory to form a minimum burst length.

10. Data management apparatus as recited in claim 8, wherein said enabling means further for writing said burst into said buffer memory, and after said burst written into said buffer memory further for performing a retry routine if said burst determined invalid.

11. Data management apparatus as recited in claim 10, wherein said retry routine includes moving said Current Position pointer to said Start of Burst pointer and then rewriting said burst into said buffer memory.

12. Data management apparatus as recited in claim 11, wherein said enabling means further for performing a burst read operation upon said buffer memory in response to said logical difference indicating there are enough data packets in said buffer memory to form a minimum burst length.

13. Data management apparatus as recited in claim 12, wherein said first pointer generating means comprises a first storage register, said second pointer generating means comprises a second storage register and said third pointer generating means comprises a third storage register.

14. A method for use by a mass storage device device to enable a transfer of a burst from an externally connected host computer, comprising:

(a) generating a first pointer, a second pointer and a third pointer;

(b) enabling said transfer of said burst only if said first pointer and said second pointer are identifying a same storage area in a buffer memory of said mass storage device and if a logical difference between said first pointer and said third pointer indicates that said buffer memory has enough storage areas to receive said burst without corrupting previously stored data.

15. The method of claim 14, wherein said first pointer comprises a Start of Burst pointer, said second pointer comprises a Current Position pointer and said third pointer comprises a Tape Mechanism pointer.

16. The method of claim 15, further including the steps:

(c) receiving said burst into said buffer memory;

(d) determining validity of said burst;

(e) if said burst determined valid from step (e) then updating said Start of Burst pointer by moving said Start of Burst pointer to current position of said Current Position pointer; and (f) if said burst determined invalid from step (e) then moving said Current Position pointer to position of said Start of Burst pointer and re-enabling said transfer of said burst.

17. The method of claim 16, wherein said mass storage device is a tape storage device.

18. The method of claim 17, wherein said generating step further includes a sub-step of storing a first value representative of said Start of Burst pointer into a first storage register, a second value representative of said Current Position pointer into a second storage register and a third value representative of said Tape Mechanism pointer in a third storage register.

* * * * *